Oct. 7, 1941. P. S. HARPER 2,257,880
VALVE MECHANISM AND THE LIKE
Filed March 4, 1940 2 Sheets-Sheet 1
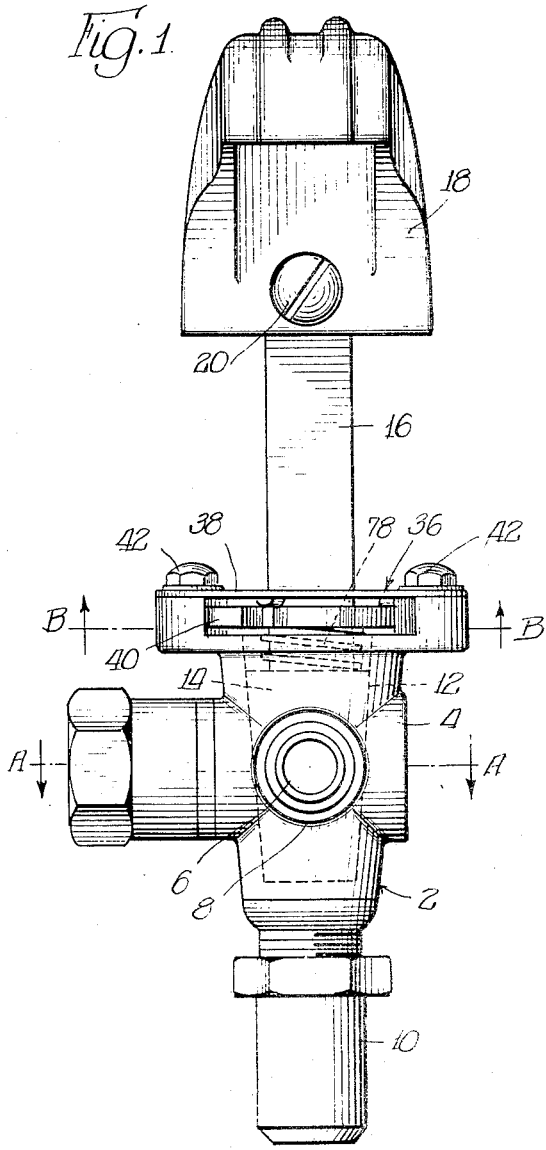
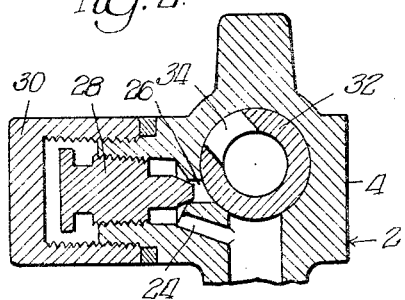
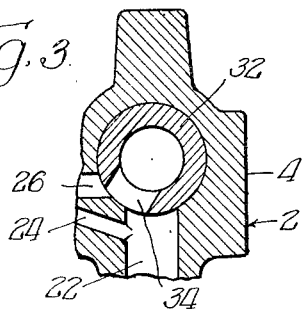
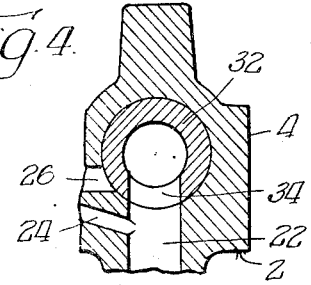
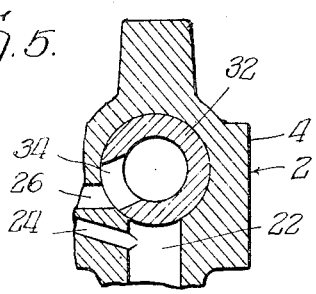
INVENTOR.
Philip S. Harper,
BY Wilkinson, Huxley, Byron & Knight
ATTORNEYS.

Oct. 7, 1941.  P. S. HARPER  2,257,880
VALVE MECHANISM AND THE LIKE
Filed March 4, 1940  2 Sheets-Sheet 2
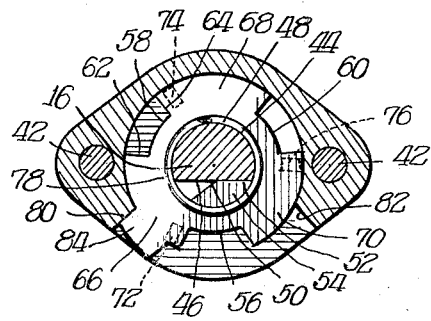
Fig. 6.
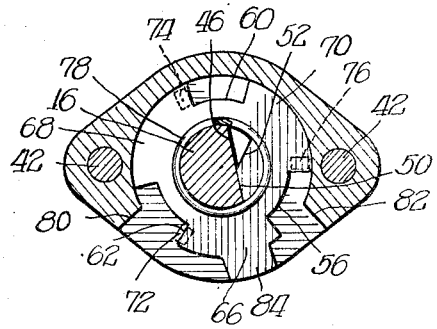
Fig. 7.
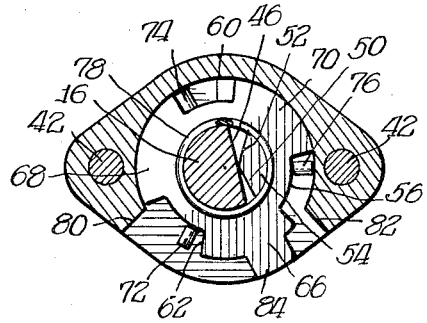
Fig. 8.
Fig. 11.
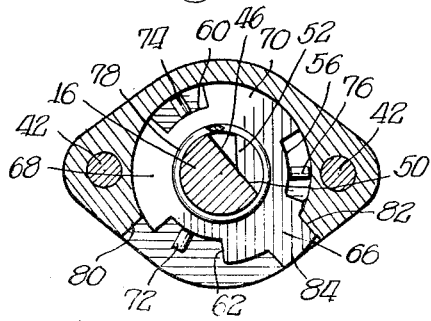
Fig. 9.
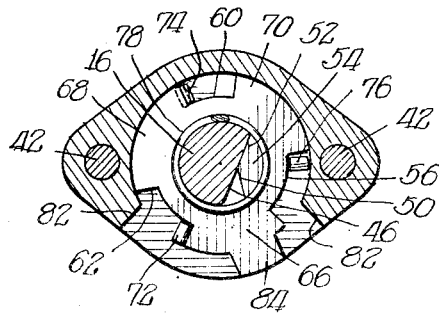
Fig. 10.
INVENTOR.
Philip S. Harper;
BY Wilkinson, Huxley, Byron & Knight
ATTORNEYS.

Patented Oct. 7, 1941

2,257,880

UNITED STATES PATENT OFFICE 2,257,880

VALVE MECHANISM AND THE LIKE

Philip S. Harper, Chicago, Ill., assignor to Harper-Wyman Company, a corporation of Illinois Application March 4, 1940, Serial No. 322,063

16 Claims. (Cl. 251—163)

The present invention relates to valve mechanisms, and more in particular to novel control means for valve mechanisms adapted for use in conjunction with gas burners and the like.

Among the objects of the present invention is to provide in a valve mechanism having means for establishing varying flow capacities, novel control mechanism for positively indicating various operating positions assumed by said valve mechanism to provide for the said varying flow capacities.

Prior art developments within the field encompassed by the present invention have provided various valve structures whereby these varying flow capacities could be established without, however, embracing within their scope positive control means for indicating certain positions of the valve, such, for example, as the positions which the valve would assume for lighting and other operating conditions.

Furthermore, prior art contributors have failed to recognize the desirability of providing indicating means for signaling various positions of the valve for various operating conditions operable in proper sequence to signal the operator upon normal operation of the valve that flow of combustible material in the system in sufficient quantities for normal lighting conditions has been established, and to then signal the operator of another position of the valve for restricted flow of said combustible medium, which normally is insufficient to establish lighting conditions but which, however, is one of many desired operating positions of the said valve.

Prior art structures accordingly are deficient in the respects cited, which is highly objectionable when it is considered that as a matter of routine habit operators of such valve mechanisms will operate the valve until signaled, which, to such operator, would normally indicate a position of said valve establishing sufficient flow in the system for lighting purposes. With such structures, however, this is not the case, and as a result such valves are operated to the extent determined by such indicating means which, although sufficient to establish normal restricted flow conditions for low capacity operation of the system, does not provide such flow that lighting can be effected. Thus the operator is misled as to the conditioning of the valve which in a good many cases maintains over a considerable length of time and which in any case leads to discharge of the combustible medium into the atmosphere, and inasmuch as these combustible gases are obnoxious and injurious, such a condition as pictured above constitutes a real health hazard.

The present invention has accordingly been predicated upon a desire to provide a novel control for a valve mechanism adapted to positively indicate a position of the valve for discharge of combustible material in sufficient volume to effect a proper lighting thereof in the system and which, although not affecting in any way the operation of the valve into its normal lighting position, nevertheless again positively indicates to the operator a low or restricted operating position of the said valve mechanism.

Still a further object within the purview of the present invention is to provide a novel controlled valve mechanism normally operable between closed and maximum flow establishing positions but having means for indicating an intermediate position of the valve during a portion of its cycle of operation and means for indicating another position of the valve during another portion of its cycle of operation.

Still another object all within the scope of the present invention is to provide a novel controlled valve mechanism positively indicating a position of the valve when the said valve is moved in one direction and to provide further means normally inoperative during such first-named movement but operable upon movement of the valve in the opposite direction to indicate another position of the said valve.

Another object of the present invention is to provide novel control means in valve mechanism having inlet and outlet means in communication with which is a main and by-pass conduit adapted to communicate therewith by way of a conduit provided in a movable valve member either by way of both said main and by-pass conduits or either of the same, whereby positive indicating means is provided signaling the operator to indicate the said positions of the valve member with respect to either one or both of the said conduits.

Still a further object of the present invention is to provide a novel controlled valve mechanism embracing control means positively indicating to the operator varying positions of the valve for establishing varying flow conditions therethrough and which embodies suitable means to audibly indicate one of said positions and to resist normal movement of the valve to indicate another position thereof.

More particularly, the invention comprehends a novel control mechanism for valves incorporating opposed control members one of which is movable according to the movement of the valve and with which control members is associated means for abruptly moving one of the members with respect to the other to provide an audible signal upon movement of the valve member into a predetermined position, and means normally resisting movement of one of the control members with respect to the other upon movement of the valve into another position, such means providing different kinds of signaling means for indicating to the operator the positions into which the valve member has been moved. The invention, in one of its embodiments, embraces the idea of incorporating a novel indicating means hereinbefore described in valve mechanisms for burner systems wherein in one of the said indicated positions the said valve mechanism is conditioned to discharge sufficient gas for lighting purposes, and the said valve in another of its indicated positions conditions the system for flow of gas sufficient for low operating capacity. In this connection, the said control means is so constructed and arranged that operation of the valve control is effected to establish flow capacity sufficient for lighting purposes without indicating to the operator any intermediate positions of the said valve, but which control means is rendered operable to indicate to the operator at least one intermediate position after lighting has been effected and the said valve is moved into said intermediate position.

Still a further object of the present invention is to provide a novel controlled valve mechanism of simplified construction wherein the parts are easily and readily manufactured and assembled at low cost and which is positive in its operation to indicate various valve positions as hereinbefore described whereby discharge of raw gas into the atmosphere is a remote possibility, which in the past has been an inherent objectionable characteristic of prior structures in the field.

Other objects, features, capabilities and advantages are comprehended by the invention, as will later appear and as are inherently possessed thereby.

Referring to the drawings:

Figure 1 is a bottom plan view of a valve mechanism incorporating the improvements in accordance with the present invention;

Figures 2 to 5 inclusive are fragmentary views in cross section taken in the plane represented by line A—A of Figure 1, disclosing the arrangement of the valve member of the valve mechanism in its various positions in respect of the intake means therefor;

Figures 6 to 10 inclusive are views in cross section taken in the plane represented by line B—B of Figure 1 of the drawings, disclosing the control mechanism for the valve and the various positions which the elements thereof assume during normal operation of the valve; and Figure 11 is a view in cross section disclosing more in particular the detailed construction for one of the elements of the control mechanism.

Although the present invention comprehends the incorporation of the improvement in various valve structures, nevertheless the particular environment in which the same is used in accordance with the particular disclosure of this application is in a valve mechanism for controlling flow of gas or other combustible medium in a burner system for gas stoves and the like, and accordingly the embodiment selected to illustrate the improvement herein disclosed is constituted by a valve mechanism generally referred to as 2, comprising a valve housing 4 having an intake means 6 in the form of a threaded fitting 8 adapted to be connected by way of a conduit, and manifold mechanism if desired, to a source of gas or a combustible medium. This housing is further provided with an outlet means 10 in the form of a nozzle adapted to discharge said gas or combustible medium to a burner incorporated in the system. The housing is further formed with a tapered bore 12 adapted to receive a tapered valve member 14 operated by a valve stem 16 to which, at its outer end, is connected a handle or other motion transmitting means 18 secured to the said shaft 16 by means of set screw 20 or the like.

Flow of gas through the valve is effected by establishing intercommunicating relation between the intake means 6 and the outlet means 10 by way of an intake conduit 22 of intake means 6 constituting a main passageway for the gas or combustible medium, and an auxiliary or by-pass conduit 24 communicating with a conduit 26 by way of a throttling valve member 28 adjustably mounted in the housing and protected by means of the closure cap 30 whereby gas from the by-pass in regulated quantities can be discharged through conduit 26. The flow through the valve is further established by means of the valve member 14 which, as disclosed in the embodiment herein shown, is formed with a longitudinal passage 32 having one end in communicating relation with the nozzle 10 and communicating by way of a lateral port 34 formed in the wall thereof with both the main and by-pass conduits, or either one of said conduits.

The particular provision of this arrangement is a characteristic of the valve structure which provides for varying flow capacities of the valve for varying operating conditions. Illustrative of the way in which this valve mechanism is intended to operate, reference may be made to Figures 2 to 5 inclusive disclosing the valve member 14 in various positions with respect to the conduits intercommunicating with the inlet and outlet means whereby gas or a combustible medium in varying quantities can be discharged from the nozzle 10.

The particular valve herein described is so constructed that lighting of the combustible medium passing therethrough may, if desired, be effected by means of a flash tube operatively associated with the nozzle 10 through the medium of a burner, and which flash tube is also operatively associated with a constant flame source, such as a pilot light or the like. The valve structure further embodies an arrangement of the various elements constituting the same such that the burner mechanism of the system can be operated at low capacity or at increasingly various operating capacities to the full flow capacity of the valve. It is, however, a characteristic of such valve mechanism that when the valve elements are arranged for supplying a combustible medium for low capacity operation, that the supply of gas or a combustible medium is not in sufficient quantities to effect a lighting by means of the flash tube or other similar and equivalent means. Accordingly, in order to effect a lighting, the valve mechanism must be so operated as to increase the flow capacity of the system over and above the flow capacity necessary to establish low operating conditions, and accordingly, such condition is established when the valve 14 takes the position as shown in Figure 3 of the drawings wherein the laterally extending port 34 bridges the housing between by-pass conduit 26 and the main conduit 22 whereby the port 34 is in one-fourth to one-half registry with the main conduit 22 to supply a predetermined volume of gas or combustible medium to the burner system for lighting conditions.

On the other hand, operating conditions for the valve are satisfied by positioning of the valve as disclosed in Figure 5 of the drawings wherein the laterally extending port 34 communicates only with by-pass conduit 26 whereby gas is supplied from the main conduit 22 through by-pass conduit 24 to by-pass conduit 26 and through the port 34 into passageway 32 and then to the discharge nozzle 10.

Furthermore, full flow capacity of the valve may be established by operation of the valve member into the position as shown in Figure 4 of the drawings wherein the by-pass conduit 26 is blocked and the lateral port 34 is in intercommunication with the intake conduit 22. It is to be understood that by proper manipulation of the handle 18, various flow establishing positions of the valve member may be effected by proper operation of the handle 18 between the low operating position such as shown in Figure 5, and the full flow establishing position according to Figure 4 of the drawings.

In addition, the valve member 14 may be moved into its normally closed position illustrated in Figure 2 whereby the lateral port 34 is out of its communicating relation with either by-pass conduit 26 or main conduit 22.

The present invention is particularly concerned with a novel control mechanism generally referred to as 36, in operative association with the valve mechanism for positively indicating to the operator various positions of the valve which will establish varying flow capacities of the valve in accordance with the operator's wishes. Such novel control means in the embodiment disclosed takes the form of axially opposed elements 38 and 40, the former of which may be referred to as a plate member which embraces the stem 16 and is secured to the valve housing by means of the bolts 42, and the latter of which may be referred to as a stop washer which, in the environment disclosed, embraces the shaft 16 and is axially and angularly displaceable with respect of the plate member 38 for the purposes to be hereinafter more fully described.

In the illustrative example of the invention, the valve stem 16 is D-shaped in cross section, being constituted by the cylindrical surface 44 and the flat surface 46, the radius of curvature of the surface 44 conforming substantially to the radius of curvature of an opening 48 in the stop washer 40 which embraces the stem as disclosed, and which opening is further formed in part by the angularly disposed edges 50 and 52 which converge inwardly into intersecting relation from the circular edge 48 to define a stop lug 54 cooperating with the D-shaped stem 16, as will be later more fully described.

This stop washer 40 is further provided with angularly spaced open circumferentially disposed recesses or slots 56, 58 and 60, each of which is defined in part by end walls such as 62 and 64, between which recesses are intermediate parts 66, 68 and 70, which intermediate parts, during a certain portion of the cycle of operation of the valve member 14, are adapted to engage angularly spaced projections 72, 74 and 76, respectively, struck out from the plate member 38 as shown in Figure 11, and to engage the said plate member between the said projections during another portion of the cycle of operation of the said valve member 14 when the said projections are received in the slots or recesses 56, 58 and 60.

This stop washer 40 is maintained in its axial relation with plate member 38 either in its engaging relation with the projections of plate member 38 or in its displaced axial position in engagement with said plate by means of a coil spring 78 embracing the stem 16 and which abuts the said stop washer 40 at one end and the valve member 14 at its other end, the said coil spring serving in the dual capacity of displacing the stop washer axially with respect to the plate member 38 for a function to be hereinafter more fully disclosed, and at the same time urge the valve member 14 into its normal operative relation with the tapered bore 12 to provide a substantially tight fit therefor and to effect normal flow through the valve mechanism.

The housing is provided with spaced abutments 80 and 82 disposed in the way of a lug 84 projecting from the intermediate portion 66 of stop washer 40 and engageable therewith for defining the limits of operation of the valve member 14 between its normal closed position as shown in Figure 2 and its normal full operative position for establishing maximum flow capacity for the valve, as shown in Figure 4 of the drawings. However, as will be observed from the drawings, angular movement of the valve member 14 between the said positions of the valve member 14 is greater than the angular movement of the said stop washer 40 between its limits determined by abutments 80 and 82 because of lost motion between said stop washer and stem provided by the space between either or both the edges 50 and 52 defining lug 54 and the flat surface 46 of the stem 16, as will be more clearly appreciated as the description proceeds.

When the control mechanism is in the position shown in Figure 6 wherein the lug 84 is in abutting relation with abutment 80 and the said stop washer is in engagement with the projections 72, 74 and 76 of plate member 38, the valve member is in its closed position as shown in Figure 2. When it is desired to operate the valve to establish sufficient flow of gas or a combustible medium through the valve for lighting purposes, which flow can be established by movement of valve member to the position as shown in Figure 3 of the drawings, valve stem 16 is rotated from the position shown in Figure 6 to the position shown in Figure 8 of the drawings. During the initial movement of said valve stem, lost motion is taken up between the same and stop washer 40, after which surface 46 engages the surface 50 of lug 54 to rotate stop member 40. This stop member in its counter-clockwise movement soon assumes the position as shown in Figure 7, at which time the same, under the impulse f spring 78, is about to be released from its engagement with said projections for abrupt axial displacement toward plate member 38 for producing an audible signal indicating to the operator that valve member 14 is positioned for establishing a flow capacity necessary for lighting conditions. Accordingly, a slight movement of valve stem 16 from the position as shown in Figure 7 causes the plate to be released from its engaging relation with the projections, at which time the same, under the influence of spring 78, is moved abruptly over the upper part 86 of the said projections. This movement of stop washer 40 over the upper part 86 of the projections, under the pressure of spring 78, causes the stop washer to be axially and angularly displaced with respect of the projections and moved abruptly into engagement with the said plate 38 in the position shown in Figure 8 to produce an audible signal indicating the proper position of the valve member 14 for lighting conditions.

After lighting of the burner has been effected, the valve member 14 may be moved either to full open position such as shown in Figure 4, or to the low operating position such as shown in Figure 5. Of course, in establishing the full operating position according to Figure 4, the valve stem 16 is moved in a counter-clockwise direction according to Figure 8 to take up lost motion between the same and the stop washer 40, such movement being continued until lug 84 engages with abutment 82, there being no indicating means between the position of the stop washer according to Figure 8 and that according to Figure 9 for advising the operator of the flow condition of gas through the burner.

On the other hand, however, it is highly desirable to indicate to the operator after lighting of the burner has taken place the normal positioning of valve member 14 to establish low operating flow capacity of the valve mechanism as shown in Figure 5 of the drawings, and accordingly, when the valve stem 16 is turned in a clockwise direction as shown in Figure 8 of the drawings, the lost motion between the stem and stop washer is first taken up, after which the surface 46 of the valve stem engages the angularly disposed edge 52 of lug 54 whereby the stop washer is moved clockwise in accordance with the movement of stem 16 until such time as the end walls 62 of the recesses of stop washer 40 engage the lower part 87 of their respective projections, which resistance to further movement of stop washer 40 is imparted to the operator, clearly indicating to said operator that a low condition has been established according to Figure 5.

The construction of the projections 72, 74 and 76 and the stop washer 40 is such that resistance to movement of valve member 14 from the position as shown in Figure 5 can be overcome by applying slightly greater amounts of pressure to handle 18, whereby the valve may be moved into its normal closed position as shown in Figures 2 and 6, when desired.

The improvement as hereinbefore described embraces within its scope novel control means in the valve for indicatng to the operator a position of the valve for establishing lighting conditions, as well as indicating to the operator the establishment of low operating conditions, which novel features of construction are advantageous in a structure of this kind in that no signal is transmitted to the operator until such time as the valve elements are in a position to deliver a sufficient amount of gas or a combustible medium to light the burner of the system. This attribute is of importance in that under normal conditions an operator will manipulate the valve until an audible signal is heard which definitely and positively establishes flow conditions for lighting, after which the valve mechanism may be operated to either its full operating capacity or its low operating capacity. Thus lighting of the burner takes place expeditiously and positively without any quantity of raw gas or a combustible medium being discharged into the room.

It is also to be appreciated that the arrangement of the various elements of the control mechanism is such that the second indicating means for signaling the conditioning of the valve for low operating conditions is inoperative during the operation of the valve to establish proper lighting conditions, but is operative upon movement of the valve in the opposite direction to establish said low operating conditions. Further, it is also to be observed that the projections of plate 38 are of such a construction and arrangement as to provide means for releasing the stop washer 40 to produce an audible signal and to provide means resisting movement of the stop washer which, in effect, is an indicating means signaling to the operator the positioning of the valve to establish another flow condition of the valve mechanism.

While I have herein described and upon the drawings shown an illustrative embodiment of the invention, it is to be understood that the invention is not limited thereto but may comprehend other constructions, arrangement of parts, details and features without departing from the spirit of the invention.

I claim:

1. In a valve, the combination of intake and outlet means, means disposed between said intake and outlet means for establishing varying flow capacity of said valve including a movable valve member having means establishing said varying flows in accordance with its position, control means for said valve member including a control member having a lost motion connection with said valve member, means cooperating with said control member for indicating one of the positions of said valve member for predetermined flow of fluid through said valve, and said last-named means cooperating with said control member upon angular displacement of said valve member and said control member resisting movement of said valve member when the same is in another position for varying the flow capacity of said valve.

2. In a valve, the combination of intake and outlet means, means disposed between said intake and outlet means for establishing varying flow capacity of said valve including a movable valve member having means establishing said varying flows in accordance with its position, control means operatively associated with said valve member through lost motion means, said control means having means for audibly indicating one of the positions of said valve member for predetermined flow of fluid through said valve, said last-named means resisting movement of said valve member when the same is displaced into another position through said last motion means for varying the flow capacity of said valve.

3. In a valve, the combination of intake and outlet means, means disposed between said intake and outlet means for establishing varying flow capacity of said valve including a movable valve member having means establishing said varying flows in accordance with its position, control means operatively associated with said valve member through lost motion means for limiting movement of said valve member between its normally closed and maximum flow establishing positions, said control means including means for indicating a position of said valve member intermediate said first-named positions, said last-named means resisting movement of said valve member when displaced into another of its positions through said lost motion means intermediate said first-named intermediate position and one of said first-named flow establishing positions.

4. In a valve, the combination of intake and outlet means, means disposed between said intake and outlet means for establishing varying flow capacity of said valve including a movable valve member having means establishing said varying flows in accordance with its position, and control means operatively associated with said valve member through lost motion means for limiting movement of said valve member between its normally closed and maximum flow establishing positions, said control means including means for audibly indicating a position of said valve member intermediate said first-named positions, said last-named means resisting movement of said valve member when displaced into another of its positions through said lost motion means intermediate said first-named intermediate position and one of said flow establishing positions.

5. In a valve, the combination of intake and outlet means, means disposed between said intake and outlet means for establishing varying flow capacity of said valve including a movable valve member having means establishing said varying flows in accordance with its position, control means operatively associated with said valve member through lost motion means for limiting movement of said valve member between its normally closed and maximum flow establishing positions, said control means including means for indicating a position of said valve member intermediate said first-named positions, and means normally inoperative to indicate the positioning of said valve during a portion of its cycle of operation but operative through the lost motion of said lost motion means to indicate a position of said valve intermediate said first-named intermediate position and one of said first-named flow establishing positions.

6. In a valve, a combination of intake and outlet means, means disposed between said intake and outlet means for establishing varying flow capacity of said valve including a movable valve member having means establishing said varying flows in accordance with its position, control means operatively associated with said valve member through lost motion means and including means operable during movement of said valve member in one direction to indicate a predetermined position of said valve member, and said last-named means being normally inoperative during said first-named movement but operable during movement of said valve member in the opposite direction through said lost motion means for indicating another position of said valve member.

7. In a valve, the combination of a housing having intake and outlet means and a main and a by-pass conduit communicating with said intake means, a valve member seating in said housing and having a conduit for establishing varying flow between said intake and outlet means through said first-named conduits, said valve member having its conduit so constructed and arranged as to communicate with either of said conduits upon predetermined positioning of the same, and control means operatively associated with said valve member through a rotary lost motion connection permitting limited relative angular movement therebetween, said control means including means for indicating the positioning of said valve member with its conduit in appreciable registry with said main conduit when the lost motion connection is at one limit of said relative angular movement, and means for indicating the positioning of said valve member with its conduit communicating only with said by-pass conduit when the lost motion connection is at another limit of said relative angular movement.

8. In a valve, the combination of a housing having intake and outlet means and a main and a by-pass conduit communicating with said intake means, a valve member seating in said housing and having a conduit for establishing varying flow between said intake and outlet means through said first-named conduits, said valve member having its conduit so constructed and arranged as to communicate with either of said conduits upon predetermined positioning of the same, and control means operatively associated with said valve member through a rotary lost motion connection permitted limited relative angular movement therebetween, said control means including means for audibly indicating the positioning of said valve member with its conduit in appreciable registry with said main conduit when the lost motion connection is at one limit of said relative angular movement, and means normally resisting movement of said valve member for indicating the positioning of the same with its conduit communicating only with said by-pass conduit when the lost motion connection is at another limit of said relative angular movement.

9. In a valve, the combination of a housing having intake and outlet means and a main and a by-pass conduit communicating with said intake means, a valve member seating in said housing and having a conduit for establishing varying flow between said intake and outlet means through said first-named conduits, said valve member having its conduit so constructed and arranged as to communicate with either of said conduits upon predetermined positioning of the same, and control means operatively associated with said valve member through a rotary lost motion connection permitting limited relative angular movement therebetween, said control means including means operable during movement of said valve member in one direction for indicating the positioning of said valve member to provide appreciable registry of its conduit with said main conduit when the lost motion connection is at one limit of said relative angular movement, and said last-named means being normally inoperative during said first-named movement but operable during movement of said valve member in the opposite direction to indicate the positioning of said valve member to provide only for intercommunication between its conduit and said by-pass conduit when the lost motion connection is at another limit of said relative angular movement.

10. In a valve, the combination of a housing member having intake and outlet means, means disposed between said intake and outlet means for establishing varying flow capacity of said valve including a rotatable valve member mounted in said housing and having means establishing said varying flow in accordance with its position, control means operatively associated with said valve member through a rotary lost motion connection permitting limited relative angular movement therebetween to indicate various positions of said valve member, said control means comprising opposed control members one of which is angularly displaceable with respect to the other by rotation of said valve member, resilient means for normally urging one of said control members toward the other, means operable when the lost motion connection is at one limit of said relative angular movement for releasing one of said control members with respect to the other to produce an audible signal indicating one position of said valve member when moved in one direction, and means resisting relative angular movement of one of said control members with respect to the other when the lost motion connection is at another limit of said relative angular movement to indicate another position of said valve.

11. In a valve, the combination of a housing member having intake and outlet means, means disposed between said intake and outlet means for establishing varying flow capacity of said valve including a rotatable valve member mounted in said housing and having means establishing said varying flow in accordance with its position, control means operatively associated with said valve member through a rotary lost motion connection permitting limited relative angular movement therebetween to indicate various positions of said valve member, said control means comprising axially opposed control members relatively angularly and axially displaceable according to predetermined movement of said valve member, resilient means for normally urging one of said members toward the other, said control members having means operable when the lost motion connection is at one limit of said relative angular movement for abruptly releasing one of said control members with respect to the other to produce an audible signal to indicate one position of said valve member during a portion of its cycle of operation, and said control members having means normally inoperative during said first-named cycle of operation but operative during another cycle of operation of said valve member when the lost motion connection is at another limit of said relative angular movement to resist movement thereof to indicate another position of said valve member.

12. In a valve, the combination of a housing member having intaken and outlet means, means disposed between said intake and outlet means for establishing varying flow capacity of said valve including a rotatable valve member mounted in said housing and having means establishing said varying flow in accordance with its position, control means for limiting movement of said valve member between its normally closed and maximum flow establishing positions, said control means being operatively associated with said valve member through a rotary lost motion connection permitting limited relative angular movement therebetween, said control means including axially opposed control members relatively angularly and axially displaceable according to predetermined movement of said valve member, said control members having a cooperating recess and projection, resilient means for normally urging one of said control members toward the other when abruptly released upon reception of said projection in said slot when the lost motion connection is at one limit of said relative angular movement to produce an audible signal indicating a position of said valve intermediate said first-named positions, and said projection abutting a marginal edge of said slot to resist movement of said valve member when the lost motion connection is at another limit of said relative angular movement to indicate another position of said valve member intermediate the last-named position and one of said first-named positions.

13. In a valve, the combination of a housing member having intake and outlet means, means disposed between said intake and outlet means for establishing varying flow capacity of said valve including a rotatable valve member mounted in said housing and having means establishing said varying flow in accordance with its position, control means for said valve comprising axially opposed control members constituted by a plate secured to said housing and a stop washer mounted on said valve member through a rotary lost motion connection permitting limited relative angular movement therebetween, said plate having a plurality of angularly spaced projections, said stop washer having a plurality of angularly spaced slots adapted to receive said projections when said valve member is in certain positions and intermeditae portions therebetween engageable with said projections when said valve is in other of its positions, a spring member adapted to abruptly move said stop washer toward said plate upon release of the engagement of said projections with said intermediate portions when the lost motion connection is at one limit of said relative angular movement to produce a signal indicating one position of said valve member upon movement thereof in one direction, and said projections being engageable with marginal edges of said slots to resist movement of said valve member in the opposite direction when the lost motion connection is at another limit of said relative angular movement to indicate another position thereof.

14. In a valve, the combination of a housing member having intake and outlet means, means disposed between said intake and outlet means for establishing varying flow capacity of said valve including a rotatable valve member mounted in said housing and having means establishing said varying flow in accordance with its position, control means for said valve comprising axially disposed control members constituted by a plate secured to said housing and a stop washer mounted on said valve member through lost motion means, said housing having spaced abutments defining the normally closed and maximum flow establishing positions of said valve, said stop washer having a lug adapted to cooperate with said abutments, said plate member having a plurality of angularly spaced projections, said stop washer having a plurality of angularly spaced slots adapted to receive said projections during a portion of the cycle of operation of said valve member and intermediate portions therebetween engageable with said projections during another portion of the cycle of operation of said valve member, a spring normally urging said stop washer toward said plate whereby said stop washer is abruptly moved into engagement with said plate upon release of said projections from engagement with said intermediate portions and reception by said slots to produce an audible signal indicating a valve position intermediate said first-named positions upon operation of said valve member from its normally closed position toward maximum flow establishing position, said projections having means for advancing said stop washer angularly with respect to said valve member when said audible signal is produced, and said projections having means engageable with the adjacent marginal edges of said slots to resist movement of said stop washer upon movement of said valve member toward its normally closed position to indicate a position intermediate said first-named intermediate position and said normally closed position.

15. In a valve, the combination of a housing having intake and outlet means and a main and a by-pass conduit communicating with said intake means, a valve member seating in said housing and having a conduit for establishing varying flow between said intake and outlet means through said first-named conduits, said valve member having its conduit so constructed and arranged as to communicate with both of said first-named conduits or only with either of said conduits upon predetermined positioning of the same, control means for said valve comprising axially disposed control members constituted by a plate secured to said housing and a stop washer mounted on said valve member through lost motion means, said housing having spaced abutments defining the normally closed and maximum flow establishing positions of said valve, said stop washer having a lug adapted to cooperate with said abutments, said plate member having a plurality of angularly spaced projections, said stop washer having a plurality of angularly spaced slots adapted to receive said projections during a portion of the cycle of operation of said valve member between positions thereof where its conduit is in communication with both said main and by-pass conduits and said main conduit only, said stop washer having intermediate portions therebetween engagable with said projections during another portion of the cycle of operation of said valve member between positions thereof where its conduit is in communication with said by-pass conduit only and both said main and by-pass conduits, a spring normally urging said stop washer toward said plate whereby said stop washer is abruptly moved into engagement with said plate upon release of said projections from engagement with said intermediate portions and reception by said slots to produce an audible signal indicating a valve position wherein its conduit is in communication with said main and by-pass conduits upon operation of said valve member from its normally closed position toward maximum flow establishing position, said projections having means for advancing said stop washer angularly with respect to said valve member when said audible signal is produced, and said projections having means engageable with the adjacent marginal edges of said slots to resist movement of said stop washer upon movement of said valve member toward its normally closed position to indicate a position for said valve member wherein its conduit is in communication only with said by-pass conduit.

16. In a valve, the combination of a housing member having intake and outlet means, means disposed between said intake and outlet means for establishing varying flow capacity of said valve including a movable valve member mounted in said housing and having means establishing said varying flows in accordance with its position, control means to indicate various positions of said valve member, said control means comprising axially opposed members one being associated with said housing member and the other being movable with said valve member through a rotary lost motion connection permitting limited relative angular movement therebetween, one of said last-named members being provided with axially spaced surfaces cooperating with the other of said members, resilient means adapted to urge one of said last-named members from its association with one of said surfaces into association with the other of said surfaces when the lost motion connection is at one limit of said relative angular movement to produce an audible signal indicating one position of said valve member when moved in one direction, and abutment means between said surfaces normally inoperative during movement of said valve member in said one direction but engageable with the other of said last-named members when the lost motion connection is at another limit of said relative angular movement to indicate another position of said valve member when moved in the opposite direction.

PHILIP S. HARPER.

CERTIFICATE OF CORRECTION.

Patent No. 2,257,880.  October 7, 1941.

PHILIP S. HARPER.

It is hereby certified that error appears in the printed specification of the above numbered patent requiring correction as follows: Page 4, first column, line 55, for "indicatng" read --indicating--; and second column, line 57, claim 2, for the word "last" read --lost--; page 5, second column, line 20, claim 8, for "permitted" read --permitting--; page 6, first column, line 48, claim 12, for "intaken" read --intake--; and second column, line 22, claim 13, for "intermeditae" read --intermediate--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.